Sept. 3, 1929.   J. CARICH   1,726,538
HARP FOR TROLLEY POLES
Filed Jan. 9, 1928   2 Sheets-Sheet 1
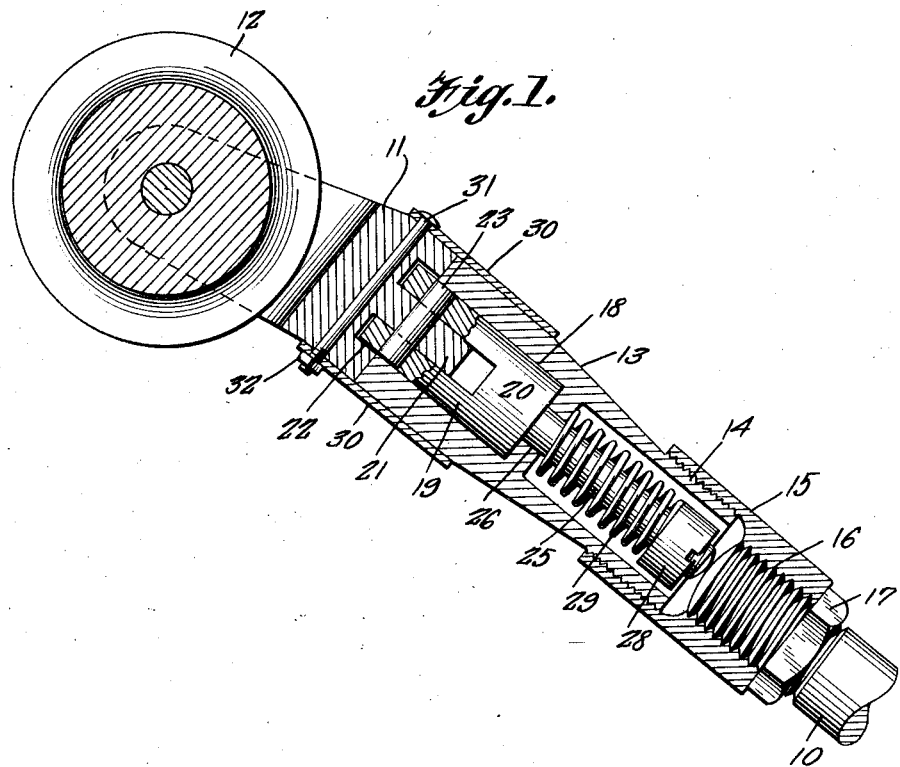
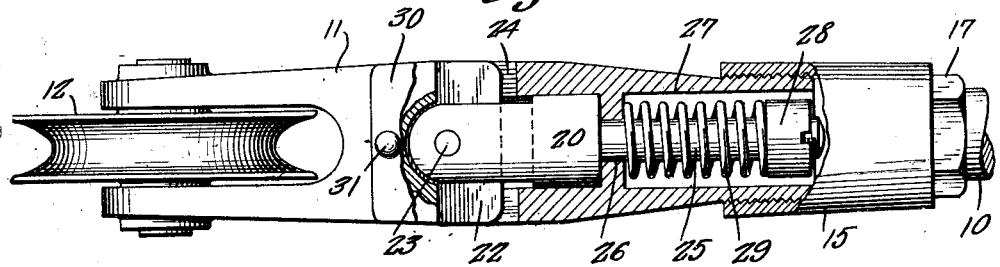
Joseph Carich,
INVENTOR
BY Victor J. Evans
ATTORNEY
WITNESS:

Sept. 3, 1929.  J. CARICH  1,726,538
HARP FOR TROLLEY POLES
Filed Jan. 9, 1928  2 Sheets-Sheet 2

Joseph Carich, INVENTOR
BY Victor J. Evans
ATTORNEY

Patented Sept. 3, 1929.

1,726,538

UNITED STATES PATENT OFFICE.

JOSEPH CARICH, OF MIAMI, ARIZONA.

HARP FOR TROLLEY POLES.

Application filed January 9, 1928. Serial No. 245,468.

This invention relates to improvements in trolley harps and has for an object the provision of means for mounting a harp upon the end of a trolley arm, in such manner that the harp may move pivotally and laterally with respect to the arm, and permit the trolley wheel or glider to readily follow the wire and thus eliminate danger of the wheel leaving the wire, as well as to reduce wear upon both said wheel and wire.

Another object of the invention is the provision of novel means for connecting the harp to the arm to provide for the movement above stated, together with means for protecting the joint between said harp and arm.

With the above and other objects in view, the invention further includes the following novel features and details of construction, to be hereinafter more fully described, illustrated in the accompanying drawings and pointed out in the appended claims.

In the drawings:—

Figure 1 is a sectional view illustrating the invention.

Figure 2 is a top plan view partly in section.

Figure 3:
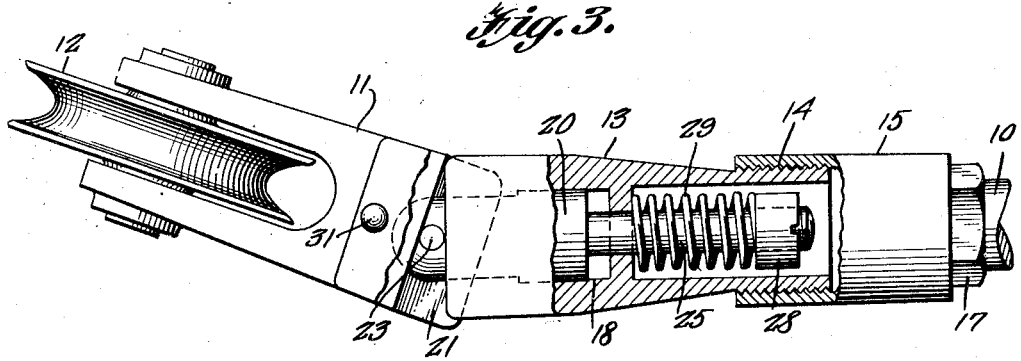
Figure 3 is a view similar to Figure 2 but showing the harp moved pivotally and laterally.
Figure 4:
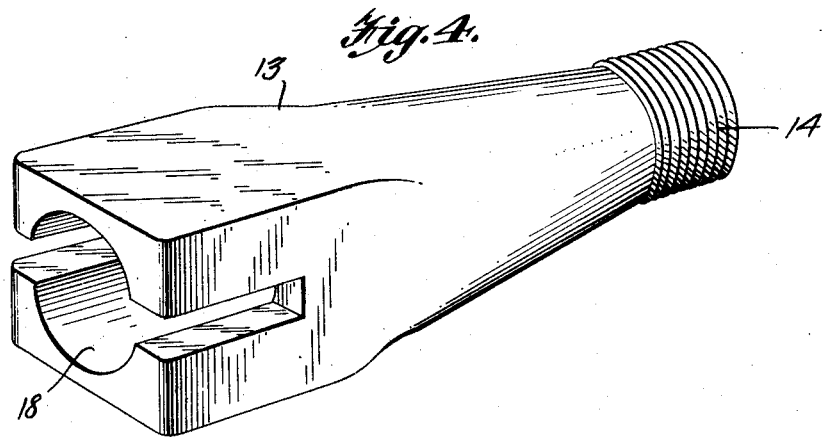
Figure 4 is a detail perspective view of the head.
Figure 5:
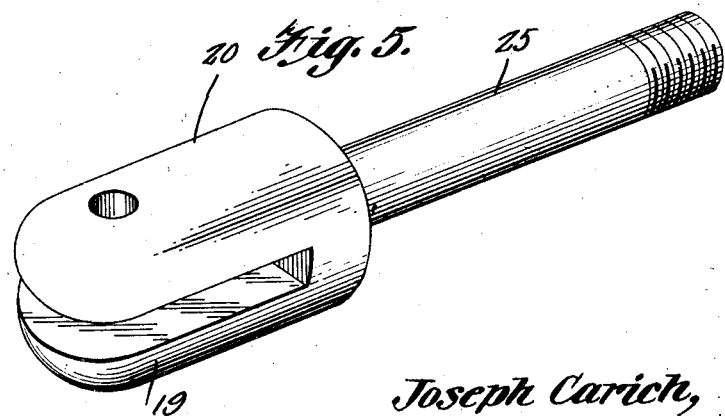
Figure 5 is a similar view of the coupling member.

Referring to the drawings in detail wherein like characters of reference denote corresponding parts, the reference character 10 indicates a portion of a trolley arm which may be of any suitable length and attached to a car or like vehicle in any suitable manner. This arm is adapted to support a harp 11 which carries a trolley wheel 12, the latter being adapted to engage a trolley wire, as will be readily appreciated.

The invention resides in the novel means for connecting the harp to the arm and for this purpose there is provided a head 13 having a threaded end 14 and this end has a threaded connection with one end of a sleeve 15. The sleeve 15 is internally threaded to receive the threaded end 16 of the arm 10, a lock nut 17 being employed to hold the parts in position.

The head 13 is provided at one end with a socket 18 which receives the bifurcated end 19 of a coupling member 20.

Extending from the harp 11 is a tongue 21 which is received within the bifurcated end of the coupling member 20, the furcations of this coupling member extending into recesses 22 provided in the harp 11 upon opposite sides of the tongue. A pin 23 serves to pivotally connect the bifurcated end of the coupling member to the tongue 21. The head 13 is provided with laterally extending slots 24 which open into the socket 18, and these slots receive the tongue 21, so as to permit of pivotal movement of the harp upon the outer end of the head.

The coupling member 20 is provided with an elongated reduced portion 25 which extends through an opening 26 provided in the head and which operates within a socket 27 provided in the inner end of the head. Threadedly mounted upon the end of the reduced portion 25 is a nut 28 and positioned between this nut and the inner end of the socket 27 is a coiled spring 29. The tension of this spring may be regulated by adjusting the nut 28.

It will be apparent from reference to Figures 1, 2 and 3 of the drawings that the harp 11 will be normally held in line with the trolley arm, this position being yieldably maintained by the action of the spring 29. However, when necessary, as in following the curvature of a trolley wire, the harp 11 may move pivotally as shown in Figure 3. This movement will act to compress the spring 29, so that as soon as the trolley wheel reaches a straight section of the wire, the harp will resume its normally straight position.

In order to protect the joint between the harp 11 and the head 13, there is secured to the harp plates 30. These plates are secured in place by means of a bolt 31 which extends through the harp and which has mounted thereon a nut 32, so that the bolts may be tightly clamped in position, or may be removed if desired for oiling or cleaning the joint.

The invention is susceptible of various changes in its form, proportions and minor details of construction and the right is herein reserved to make such changes as properly fall within the scope of the appended claims.

Having described the invention what is claimed is:—

1. A trolley harp comprising an arm carried head having a socket at its outer end, a harp, a coupling movable longitudinally within the socket and having its outer end pivotally secured to the harp, and means to mount the coupling within the head to yieldingly resist longitudinal movement.

2. A trolley harp comprising an arm carried head, a harp, a wheel carried thereby, a coupling housed within the head, a pivotal connection between the coupling and harp and a spring resisted sliding connection between the coupling and head.

3. A trolley harp comprising an arm carried head, a harp, a wheel carried thereby, a coupling housed within the head, a pivotal connection between the coupling and harp and a spring resisted sliding connection between the coupling and head and cover plates carried by the harp and overlapping the head.

4. In a trolley, an arm carried harp having spaced recesses at one end, with a tongue separating the recesses, a wheel mounted at the other end of the harp, a head having a socket in one end, slots extending radially from the socket to receive the tongue, a coupling movable within the socket and bifurcated at one end to receive the tongue, a pivotal connection between the tongue and coupling, and a yieldable connection between the coupling and head.

In testimony whereof I affix my signature.

JOSEPH CARICH.